United States Patent
Makimura et al.

(10) Patent No.: US 7,442,429 B2
(45) Date of Patent: Oct. 28, 2008

(54) GRAIN-FINISHED ARTIFICIAL LEATHERS

(75) Inventors: Masaru Makimura, Okayama (JP); Hisao Yoneda, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/587,593

(22) PCT Filed: Apr. 26, 2005

(86) PCT No.: PCT/JP2005/007863

§ 371 (c)(1), (2), (4) Date: Oct. 25, 2006

(87) PCT Pub. No.: WO2005/106108

PCT Pub. Date: Nov. 10, 2005

(65) Prior Publication Data

US 2007/0231547 A1 Oct. 4, 2007

(30) Foreign Application Priority Data

Apr. 28, 2004 (JP) .............................. 2004-132851

(51) Int. Cl.
*B32B 3/00* (2006.01)
*B32B 5/02* (2006.01)
*B32B 9/00* (2006.01)

(52) U.S. Cl. ........................... 428/151; 442/59; 442/63; 442/67; 442/76; 442/102

(58) Field of Classification Search ................ 442/59, 442/63, 67, 76, 102; 428/151

See application file for complete search history.

(56) References Cited

U.S. PATENT DOCUMENTS 3,841,897 A * 10/1974 Okazaki et al. ............. 428/151

6,451,716 B1 * 9/2002 Sasaki et al. ................. 442/77

FOREIGN PATENT DOCUMENTS

| JP | 06 240584 | 8/1994 |
|---|---|---|
| JP | 2000 256971 | 9/2000 |
| JP | 2000 273769 | 10/2000 |
| JP | 2001 081676 | 3/2001 |
| JP | 2001 192978 | 7/2001 |
| JP | 2004 100137 | 4/2004 |

* cited by examiner

*Primary Examiner*—Norca Torres-Velazquez
(74) *Attorney, Agent, or Firm*—Oblon, Spivak, McClelland, Maier & Neustadt, P.C.

(57) ABSTRACT

A grain-finished artificial leather composed of a base layer and a coating layer Y formed on one of the surfaces of the base layer. The base layer is composed of an entangled nonwoven fabric X made of bundles of microfine fibers having an average single fiber fineness of 0.07 dtex or less and impregnated with a polymeric elastomer A and a polymeric elastomer B. The entangled nonwoven fabric X is composed of a lower layer $X_A$ and an upper layer $X_B$ wherein the lower layer $X_A$ is impregnated mainly with the polymeric elastomer A which is substantially not adhered to the bundles of microfine fibers and the upper layer $X_B$ is impregnated mainly with the polymeric elastomer B which is substantially not adhered to the bundles of microfine fibers. The coating layer Y is composed of a coating layer $Y_B$ having a thickness of 1 to 10 μm which is made of the polymeric elastomer B and formed on the upper layer $X_B$, a coating layer $Y_C$ which is made of a polymeric elastomer C and formed on the coating layer $Y_B$, and a finished layer $Y_E$ which is formed on the coating layer $Y_C$. The grain-finished artificial leather having the above structure combines a natural leather-like, delicate appearance, a good softness and flexibility, and a high peel strength.

6 Claims, No Drawings

GRAIN-FINISHED ARTIFICIAL LEATHERS

TECHNICAL FIELD

The present invention relates to grain-finished artificial leathers which combine a natural leather-like, delicate appearance, a good softness and flexibility, and a high peel strength. The grain-finished artificial leathers have a wide range of application fields such as shoes, game balls and bags.

BACKGROUND ART

Recently, synthetic leathers and artificial leathers have come to be substituted for natural leathers in various fields such as shoes, clothes, gloves, bags, game balls and interior decorations. The synthetic leathers and artificial leathers are required to have a high quality, aesthetically pleasing appearance and comfortable feel upon use, and in addition, strongly required to simultaneously have a natural leather-like, delicate appearance, a good flexibility, and particularly in case of shoes, a high peel strength.

Various flexible natural leather-like sheets have been proposed. For example, proposed is a leather-like sheet which is produced by adhesively laminating a resin film having a grain surface resembling natural leathers onto a substrate composed of an entangled nonwoven fabric made of microfine fibers of 0.1 dtex or less and a polyurethane resin coagulated in the nonwoven fabric after impregnation. Such leather-like sheet has a high peel strength enough to use in sport shoes. However, since the surface finished layer is thick and does not fit with the substrate, the natural leather-like properties are not obtained. In addition, it is difficult to form deep grain patterns.

Also proposed is a leather-like sheet which is produced by forming a foamed layer on the substrate as mentioned above by coating a polyurethane solution and wet-coagulating it, then coloring the foamed layer, and finally emboss-processing the foamed layer. Such leather-like sheet has a natural leather-like appearance, but a sufficiently high peel strength is difficult to obtain because a soft elastomer should be impregnated in a relatively small amount when the softness and flexibility are important. If a sufficiently high peel strength is intended, it is necessary to impregnate a relatively hard elastomer in a large amount at the expense of the softness and flexibility. Thus, it has been quite difficult to produce a leather-like sheet which unites all of a good peel strength, flexibility and softness and a natural leather-like appearance.

A leather-like sheet has been proposed, which is produced by impregnating a polyurethane resin into an entangled nonwoven fabric made of microfine fiber-forming fibers, wet-coagulating the polyurethane resin, making the nonwoven fabric into a substrate made of bundles of microfine fibers of 0.1 dtex or less by removing one component from the microfine fiber-forming fibers, and then finishing the surface of the substrate (for example, Document 1). However, the proposed leather-like sheet is insufficient in the flexibility and peel strength, although its surface has a natural leather-like appearance.

Another proposed leather-like sheet has a porous surface layer which is continuously formed on the surface layer of the substrate from the same elastic resin as impregnated into the surface layer (for example, Document 2). However, it is difficult to obtain a sufficient peel strength, if the porous surface layer is formed from a soft resin to obtain a natural leather-like appearance. To obtain a sufficient peel strength, there has been known to form a porous surface layer made of a relatively hard elastomer directly on a substrate, or form a porous surface layer on a substrate via a high-density resin layer, and further, form a porous skin layer on the porous surface layer. When a natural leather-like appearance can be obtained by an emboss processing, such leather-like sheet has a sufficient peel strength, but the softness is deteriorated. If the softness is preferentially provided, a natural leather-like appearance becomes difficult to obtain. When the porous surface layer is formed from a resin which can be easily processed by embossing and the high-density resin layer is formed from a resin which is resistant to deformation by the emboss processing, a satisfactory processability is difficult to obtain in the emboss processing as compared when the porous surface layer and high-density resin layer are formed from the same resin.

To solve the above problem, the inventors have proposed a leather-like sheet having a fibrous base layer closely adhered to a porous surface layer, in which the upper layer of the fibrous base layer is impregnated with a polyurethane resin which is more resistant to thermal deformation as compared with a polyurethane resin forming the porous surface layer (Patent Document 3). To achieve a natural leather-like appearance, it is necessary to emboss-processing a porous surface layer made of a soft polyurethane resin. Therefore, the surface layer and the base layer may fail to be united in some cases when the surface layer is thick.

As mentioned above, a grain-finished artificial leather which combines a good peel strength, a soft surface, a good flexibility, and a natural leather-like, clear and delicate appearance has not yet been provided.

[Patent Document 1] JP 63-5518B
[Patent Document 2] JP 11-140779A
[Patent Document 3] JP 2003-105679A

DISCLOSURE OF THE INVENTION

An object of the present invention is to provide a grain-finished artificial leather which combines a natural leather-like delicate appearance, a good softness and flexibility, and a high peel strength. Another object is to provide a grain-finished artificial leather having a soft surface, a high peel strength and a good flexibility. Still another object is to provide a method of producing such grain-finished artificial leathers.

Thus, the present invention provides a grain-finished artificial leather having a base layer which is composed of an entangled nonwoven fabric X made of bundles of microfine fibers having an average single fiber fineness of 0.07 dtex or less and impregnated with a polymeric elastomer A and a polymeric elastomer B, and a coating layer Y which is formed on one of the surfaces of the base layer;

the entangled nonwoven fabric X being composed of a lower layer $X_A$ and an upper layer $X_B$ wherein the lower layer $X_A$ is impregnated mainly with a polymeric elastomer A which is substantially not adhered to the bundles of microfine fibers and the upper layer $X_B$ is impregnated mainly with a polymeric elastomer B which is substantially not adhered to the bundles of microfine fibers; and the coating layer Y being composed of a coating layer $Y_B$ having a thickness of 1 to 10 μm which is made of a polymeric elastomer B and formed on the upper layer $X_B$, a coating layer $Y_C$ which is made of a polymeric elastomer C and formed on the coating layer $Y_B$, and a finished layer $Y_E$ which is formed on the coating layer $Y_C$.

BEST MODE FOR CARRYING OUT THE INVENTION

The present invention will be described below in detail.

The grain-finished artificial leather is composed of a base layer which is made of an entangled nonwoven fabric X, and a polymeric elastomer A and a polymeric elastomer B each impregnated into the entangled nonwoven fabric X and a coating layer Y which is formed on one of the surfaces of the base layer. The base layer includes a lower layer $X_A$ which is mainly impregnated with a polymeric elastomer A and an upper layer $X_B$ which is mainly impregnated with a polymeric elastomer B. The coating layer Y formed on the upper layer $X_B$ includes a coating layer $Y_B$ made of a polymeric elastomer B, a coating layer $Y_C$ made of a polymeric elastomer C and a finished layer $Y_E$ in this order from the bottom.

The base layer has a flat surface and is composed of the three-dimensionally entangled nonwoven fabric X made of bundles of microfine fibers and the polymeric elastomer A and polymeric elastomer B impregnated therein. The microfine fibers have an average single fiber fineness of 0.07 dtex or less, preferably from 0.0001 to 0.07 dtex, more preferably from 0.0001 to 0.05 dtex. If the average single fiber fineness exceeds 0.07 dtex, the feel and flatness of the base layer is deteriorated, and the uniform formation of grain patterns by an emboss processing becomes difficult. The bundles of microfine fibers having an average single fiber fineness of 0.07 dtex or less are produced by a known method, for example, by removing at least one component by dissolution or decomposition from a microfine fiber-forming fiber made of at least two kinds of polymers, or mechanically or chemically splitting such microfine fiber-forming fiber at the interface between two polymer components. A single fiber fineness of 0.07 dtex or less for the microfine fibers constituting the bundles of microfine fibers can be advantageously obtained when using a sea-island microfine fiber-forming fiber rather than when using a laminated microfine fiber-forming fiber. To obtain a soft feel like natural leathers, the bundles of microfine fibers constituting the grain-finished artificial leather and the polymeric elastomer are required to be in the state substantially not bonded to each other. To achieve such state, the bundles of microfine fibers are required to be formed from a microfine fiber-forming fiber, preferably from a sea-island microfine fiber-forming fiber.

The microfine fibers in the microfine fiber-forming fiber is formed, for example, from at least one polymer selected from melt-spinnable polyamides such as 6-nylon and 66-nylon and melt-spinnable polyesters such as polyethylene terephthalate, polybutylene terephthalate and cation-dyeable, modified polyethylene terephthalates. Usable as the polymer to be removed by dissolution or decomposition is a polymer which has a solubility and decomposability different from those of the polymer for the microfine fiber, which is less compatible with the polymer for the microfine fiber, and which has a lower melt viscosity or surface tension as compared with the polymer for the microfine fiber under the spinning conditions. Example thereof is at least one polymer selected from polyethylene, polystyrene, ethylene/propylene copolymers, and modified polyesters.

The microfine fiber-forming fibers are carded and formed into a web through a webber. The obtained webs are stacked so as to achieve a desired weight and thickness and then entangled by a know method such as a needle punching and a hydroentanglement into an entangled nonwoven fabric X. A woven or knitted fabric made of bundles of microfine fibers having an average single fiber fineness of 0.07 dtex or less may be stacked on the web, if necessary. The surface of the entangled nonwoven fabric X is preferably made flat and smooth by a press treatment before impregnating the polymeric elastomer, because the flatness and smoothness of the surface of the resultant grain-finished artificial leather can be improved and the uniform grain patterns can be formed. The thickness of the entangled nonwoven fabric X or the entangled nonwoven fabric X after the press treatment is not specific and selected according to the end use of the grain-finished artificial leather, etc. If the entangled nonwoven fabric X is used in a single-layered form, the thickness is preferably from about 0.2 to about 10 mm, more preferably from about 0.4 to about 5 mm. The density is preferably from 0.15 to 0.60 g/cm$^3$, more preferably from 0.20 to 0.40 g/cm$^3$. If the density is within the above range, the grain-finished artificial leather with a soft feel is preferably obtained because the polymeric elastomer can be impregnated therein in an adequate amount so that the rubbery feel and reduction of the peel strength can be prevented.

Next, the entangled nonwoven fabric X is impregnated with solutions or dispersions of the polymeric elastomer A and polymeric elastomer B, and then the coating layer Y is formed. The polymeric elastomers A, B and C are selected from known polymeric elastomers which have been used in the production of artificial leathers, and polyurethanes are preferably used because the natural leather-like feel and properties can be obtained.

Preferred examples of the polymeric elastomers A to C for impregnating into the entangled nonwoven fabric X or forming the coating layer Y are polyurethanes which are produced by the reaction of at least one polymeric diol such as polyester-based diol, polyether-based diol and polyester/polyether-based diol; an organic polyisocyanate, preferably at least one organic diisocyanate which is aliphatic, aromatic or alicyclic; and a chain extender having two active hydrogen atoms such as low-molecular diols, low-molecular diamines and hydrazine.

Preferred is a polyurethane in which the mass percentage (N %) of the isocyanate nitrogen atoms in the organic polyisocyanate units based on the total mass of the polyurethane is 2.5 to 5%, or a mixture containing such polyurethane as the major ingredient. If N % is within the above range, the coating layer Y and base layer are good in the properties such as a wear resistance and a scratch resistance, and the artificial leather is prevented from looking cheap because of coarse creases and hard feel. In addition, the resistance to flex fatigue of the artificial leather is good.

As the polymeric elastomer C for forming the coating layer $Y_C$, a polyurethane which is capable of forming natural leather-like grain patterns by the emboss processing is preferably used. Examples thereof include polyurethanes having a hard segment mainly composed of a dihydroxyl terminated polymer glycol having a molecular weight of from 500 to 5000, 4,4'-diphenylmethane diisocyanate and a lower alkylene glycol having 2 to 6 carbon atoms, and polyurethanes having a hard segment mainly composed of a dihydroxyl terminated polymer glycol having a molecular weight of from 500 to 5000, an aliphatic or alicyclic diisocyanate and one of an organic diamine and a dihydrazide of organic acid. Copolymers or mixtures of such polyurethane are also usable as far as a sufficient softness, flexibility, durability, processability, ability of forming porous film, etc. can be obtained.

Examples of the dihydroxyl-terminated polymer glycol having a molecular weight of from 500 to 5000 include polyester-based glycols such as polyethylene adipate glycol, polybutylene adipate glycol, polyhexamethylene adipate glycol, and polycaprolactone glycol; polycarbonate-based glycols such as polyhexamethylene carbonate glycol; polyether-based glycols such as polyethylene ether glycol, polypropylene ether glycol, polytetramethylene ether glycol, and polyhexamethylene ether glycol; and mixtures thereof, with polyester-based glycols, polycarbonate-based glycols, mixed glycols of a polyester-based glycol and a polycarbonate-based glycol, and mixed glycols of a polyester-based glycol, a polycarbonate-based glycol and a polyether-based glycol being particularly preferred.

The aliphatic diisocyanate may include tetramethylene diisocyanate and hexamethylene diisocyanate, and the alicyclic diisocyanate may include cyclohexane diisocyanate and 4,4'-dicyclohexylmethane diisocyanate. The organic diamine may include p-phenylenediamine, m-phenylenediamine, 4,4'-diaminediphenylmethane, ethylenediamine, propylenediamine, diethanolamine, 4,4'-diaminodicyclohexylmethane, and isophoronediamine, and the dihydrazide of organic acid may include adipic dihydrazide, sebacic dihydrazide, terephthalic dihydrazide, and isophthalic dihydrazide. Examples of the lower alkylene glycol having 2 to 6 carbon atoms include ethylene glycol, butanediol, hexanediol, diethylene glycol, and dipropylene glycol, with ethylene glycol being preferred because uniform grain patterns can be formed by the emboss processing.

The thickness of the coating layer $Y_C$ is preferably from 0.02 to 1.50 mm, more preferably from 0.05 to 1.00 mm. Within the above range, a flat and smooth surface is obtained, uniform grain patterns can be formed by the emboss processing, and a rubbery feel is avoided.

It is necessary that the polymeric elastomer to be impregnated into the base layer, particularly, the upper layer $X_B$ to be made into contact with the coating layer Y and the polymeric elastomer for forming the coating layer $Y_B$ be the same, i.e., both be the polymeric elastomer B. If the polymeric elastomer for the upper layer $X_B$ and the polymeric elastomer for the coating layer $Y_B$ are different from each other, the base layer and the coating layer Y come to be easy to peel because the adhesion therebetween is poor.

The 100% modulus of the polymeric elastomer B is preferably from 20 to 100 kg/cm$^2$, more preferably from 30 to 70 kg/cm$^2$. The polymeric elastomer B preferably has a 100% modulus at least 30 kg/cm$^2$ higher than that of the polymeric elastomer C for forming the coating layer $Y_C$. It is also preferred that the polymeric elastomer B is capable of forming a dense porous structure and is hardly deformed by heat. The 100% modulus of the polymeric elastomer B is preferably from 30 to 60 kg/cm$^2$ higher than that of the polymeric elastomer C.

With such relationship between the 100% moduli, the polymeric elastomer B forming the coating layer $Y_B$, particularly, the upper layer $X_B$ can be prevented from being fixed at a thermally deformed state at the time the coating layer $Y_C$ is fixed at a thermally deformed state by the emboss processing, to enhance the peel strength because the bundles of microfine fibers can be held in the fixed condition while keeping the flexibility. To enhance this effect, it is preferred that the polymeric elastomer B forms a porous structure different from that formed from the polymeric elastomer C, for example, the polymeric elastomer B forms more dense porous structure as compared with the polymeric elastomer C. The largest diameter of the fine pores in the coating layer $Y_B$ and upper layer $X_B$ is preferably ½ or less, more preferably from 1/100 to ½, still more preferably from 1/70 to 1/5 of the largest diameter of the large pores in the coating layer $Y_C$ (pores with waterdrop shape or bottle shape), when observed on the surface of the cross section taken along the thickness direction of the coating layer $Y_B$ and coating layer $Y_C$. Within the above range, a soft and flexible feel is obtained because the porous structure of the coating layer $Y_B$ and upper layer $X_B$ is not collapsed during the emboss processing. If the polymeric elastomer B fails to form the porous structure, the coating layer Y and the base layer are not united by the emboss processing, to obtain a poor feel. The ratio of the pore size can be regulated within the above range by a known method, for example, by appropriately selecting the viscosity, concentration and kind of the polymeric elastomer.

The polymeric elastomer B is not limited to a specific one as far as having the above properties, and particularly preferred is polyurethane because a grain-finished artificial leather with a good feel and excellent properties is obtained. The kind of polyurethane is not specific, and may be selected from ester-based polyurethanes, ether-based polyurethanes, carbonate-based polyurethanes, copolymers thereof, and mixtures thereof. More preferred is polyurethane having a soft segment mainly composed of an ether-based polyol and a hard segment mainly composed of an aromatic diisocyanate and an aromatic diamine because of the resistance to thermal deformation.

For example, preferably used is polyurethane having a soft segment composed of 50% or more, preferably 70% or more of a polyether diol, preferably a polytetramethylene glycol having an average molecular weight of from 500 to 3000 and a hard segment composed of an aromatic diisocyanate selected from 4,4'-diphenylmethane diisocyanate, p-phenylenediamine, m-phenylenediamine, and 4,4'-diaminediphenylmethane.

A mixture of such polyurethane and another polyurethane of different type or a copolymerized polyurethane composed of an ether-based polymer diol, a polycarbonate-based polymer diol, a polyester-based polymer diol, etc. is also usable.

The amount of the polymeric elastomer B (solid basis) impregnated into the upper layer $X_B$ is preferably from 0.3 to 3.0 times, more preferably from 0.8 to 2.0 times the mass of the fibers Xb in the upper layer $X_B$. Within the above range, a sufficient binder effect and necessary peel strength are obtained without impairing the softness of the base layer.

The lower layer $X_A$ of the entangled nonwoven fabric X is impregnated with the polymeric elastomer A. The polymeric elastomer A is not limited to specific one, and polyurethane is preferably used because the resultant grain-finished artificial leather combines natural leather-like soft feel and properties. The polymeric elastomer B for forming the upper layer of substrate is required to be resistant to thermal deformation, because it is exposed to heat through the coating layer $Y_C$ during the emboss processing. However, the lower layer of substrate (lower layer $X_A$ impregnated with the polymeric elastomer A) is less influenced by heat during the emboss processing as compared with the upper layer of substrate (upper layer $X_B$ impregnated with the polymeric elastomer B). Therefore, the polymeric elastomer A can be easy to thermally deform as compared with the polymeric elastomer B so as to make the base layer soft and flexible, and a soft polyurethane is preferably used as the polymeric elastomer A. The 100% modulus of the polymeric elastomer A is lower than that of the polymeric elastomer B preferably by 10 kg/cm$^2$ or more, more preferably 10 to 60 kg/cm$^2$ or more.

The polymeric elastomer A is impregnated in an amount not deteriorating the balance of overall feel while retaining the softness, for example, the amount to be impregnated (solid basis) is preferably from 0.1 to 1.5 times, more preferably from 0.3 to 1.0 time the mass of the fibers Xa in the lower layer $X_A$. Within the above range, the overall feel is well balanced and a dense, high-quality natural leather-like feel is obtained without causing rubbery feel.

The polymeric elastomer B and polymeric elastomer A are impregnated into the upper layer $X_B$ and lower layer $X_A$, respectively, in the form as nearer the stratified structure as possible, because a natural leather-like, delicate appearance is uniformly provided by the emboss processing.

The thickness of the layer of the polymeric elastomer B impregnated into the upper layer $X_B$ is preferably from 0.01 to 1.0 mm, more preferably from 0.05 to 0.6 mm, although depending upon the thickness of the base layer. Within the above range, a sufficient peel strength is attained without losing the softness by the emboss processing, and a natural leather-like feel with a small recovering force is obtained without excessively increasing the rubber elasticity.

The grain-finished artificial leather of the present invention preferably satisfies the following formula 1:

$$[b/(Xb+b)]/[(a/(Xa+a))] \geq 1.2 \tag{1}$$

wherein b is the mass of the polymeric elastomer B impregnated into the upper layer $X_B$, Xb is the mass of the entangled nonwoven fabric constituting the upper layer $X_B$, a is the mass of the polymeric elastomer A impregnated into the lower layer $X_A$, and Xa is the mass of the entangled nonwoven fabric constituting the lower layer $X_A$, because a necessary peel strength is obtained and the softness can be sufficiently retained after the emboss processing because of its sufficient resistance to deformation. The upper limit of the formula 1 is preferably 5.0 because the grain-finished artificial leather is well balanced in feel.

The polymeric elastomer is impregnated into the base layer by a known method without specific limitation. For example, a solution or dispersion of the polymeric elastomer B is applied on the upper surface of the entangled nonwoven fabric X in a desired amount. Then, the applied solution or dispersion is allowed to impregnate spontaneously or forced to impregnate by rubbing the surface with a roll or knife. Separately, a solution or dispersion of the polymeric elastomer A is forced to impregnate into the entangled nonwoven fabric X from the lower surface by rubbing the surface with a roll or knife. The excess solution or dispersion on each surface is scraped off by a knife, etc.

Alternatively, a solution or dispersion of the polymeric elastomer A is first impregnated into a whole part of the entangled nonwoven fabric X. Then, the entangled nonwoven fabric X is compressed in the thickness direction, and immediately thereafter, a solution or dispersion of the polymeric elastomer B is applied on one surface and allowed to impregnate by the action of the elastic recovery. The excess solution or dispersion remaining on the entangled nonwoven fabric X is scraped off by a knife, etc. The coating layer $Y_B$ and the base layer may be formed simultaneously by impregnating the polymeric elastomer B into the upper layer $X_B$ and allowing it to coagulate, and then, scraping off the polymeric elastomer B on the surface of the entangled nonwoven fabric X by a knife so as to form a layer with a thickness of 1 to 10 μm after the emboss processing, although the coating layer $Y_B$ and the base layer may be formed individually as described below. If the thickness of the coating layer $Y_B$ is within the above range, a sufficient peel strength and a good flatness and smoothness are obtained without causing a rubbery feel.

The coating layer $Y_B$ and the coating layer $Y_C$ may be formed by applying solutions or dispersions of the polymeric elastomer B and the polymeric elastomer C on the upper layer $X_B$ sequentially in this order before coagulating the polymeric elastomer A and polymeric elastomer B impregnated into the entangled nonwoven fabric X, and finally, coagulating all the polymeric elastomers in a coagulation bath. In an alternative method, the polymeric elastomer A and polymeric elastomer B impregnated into the entangled nonwoven fabric X are coagulated in a coagulation bath and dried, and then, applying solutions or dispersions of the polymeric elastomer B and the polymeric elastomer C on the upper layer $X_B$ sequentially in this order, and coagulating the applied polymeric elastomer B and polymeric elastomer C in a coagulation bath. In view of the adhesion between the base layer and the coating layer Y, the former method is preferable. The adhesion of the base layer and the coating layer Y referred to herein means the state that the surface of the base layer (surface of the upper layer $X_B$) and the surface of the coating layer $Y_B$ are bonded to each other continuously all over their surfaces through substantially no another layer or material, and exclusive of the state of partial contact. The state of partial contact includes, for example, the adhesion at points which is resulted when the coating layer is bonded to the surface of the base layer having its surface gravure-coated with a solution of the polymeric elastomer, and the dry adhesion in which the base layer and the coating layer are bonded to each other through an adhesive made of a crosslinkable polymeric elastomer.

Each of the polymeric elastomers is wet-coagulated by the immersion in a solution containing a poor solvent for each polymeric elastomer or dry-coagulated by a drying under heating after being gelated, with the wet coagulation being preferred because each polymeric elastomer is easy to form a porous structure having a uniform pore size and pore distribution. Each polymeric elastomer may contain, if necessary, an additive such as colorant, coagulation regulator, anti-oxidant, and dispersant. Each polymeric elastomer may also contain a small amount of resin such as another kind of polymeric elastomer, as far as the effect of the present invention is achieved.

After the coagulation of each polymeric elastomer, the microfine fiber-forming fibers constituting the entangled nonwoven fabric X are converted into bundles of microfine fibers. Such conversion is performed by a treatment of the microfine fiber-forming fibers with a solvent or decomposer to remove at least one component or by a mechanical or chemical treatment to split the microfine fiber-forming fibers through the interface between two components. In the grain-finished artificial leather of the present invention, it is preferred that the bundles of microfine fibers and the polymeric elastomer are not substantially bonded to each other. If the polymeric elastomer is impregnated and coagulated after the conversion of the microfine fiber-forming fibers into the bundles of microfine fibers, the polymeric elastomer is likely to adhere to the bundles of microfine fibers to make the feel hard. Therefore, the conversion is preferably performed after the polymeric elastomer is provided. If the conversion is performed before the polymeric elastomer is provided, the polymeric elastomer is preferably provided after a filler removable by dissolution such as polyvinyl alcohol is temporarily provided so as to prevent the microfine fiber and the polymeric elastomer from being adhered to each other, and then, removing the filler. The term "state of the bundles of microfine fibers and the polymeric elastomer substantially not adhered to each other" referred to herein means the state in which the coagulated polymeric elastomer around the bundles of microfine fibers does not adhere to the bundles of microfine fibers at their intersecting portions and non-intersecting portions, thereby forming interstices between the bundles of microfine fibers and the coagulated polymeric elastomer.

After forming the coating layer $Y_B$ and coating layer $Y_C$ on the surface of the base layer, the finished layer $Y_E$ is formed on the coating layer $Y_C$, to obtain the grain-finished artificial leather having a natural leather-like appearance. The natural leather-like grain patterns can be provided by applying an ink made of a colorant such as pigment and dye and a known finishing resin in a manner such as a gravure coating, reverse coating or screen coating thereby to color the surface of the coating layer $Y_C$, and then, processing the surface with an emboss roll. To provide a natural leather-like appearance by the emboss processing, the emboss roll is preferably heated to 100 to 230° C. Within such range, uniform grain patterns are formed and the thermal deformation of each polymeric elastomer in the base layer is preferably avoided. The emboss roll is pressed preferably under a pressure of from 0.5 to 15 kg/cm². Within this range, uniform grain patterns are formed and a hard feel due to the compression of the lower layer $X_A$ is preferably avoided. The heating temperature is preferably from 120 to 190° C. and the pressure for pressing is preferably from 1 to 6 kg/cm², because the resultant artificial leather combines the softness, flexibility and natural leather-like appearance. The grain-finished artificial leather thus obtained has natural leather-like, clear grain patterns, high-quality appearance and good softness, flexibility, and dense feel.

After the emboss processing, the artificial leather may be mechanically crumpled or relaxed by a jet dyeing machine to form natural crumpled creases, thereby further enhance the flexibility and natural leather-like quality. By additionally applying a dyeable resin in the gravure coloration and dyeing the resin using a dyeing machine after the emboss processing, the quality of the artificial leather can be further enhanced because a clear appearance and natural shrinking are obtained and the flexibility is increased.

In the grain-finished artificial leather thus produced, the thickness is preferably from 0.2 to 10 mm for the base layer, preferably from 0.01 to 1.0 mm for the upper layer $X_B$, preferably from 1 to 10 μm for the coating layer $Y_B$, preferably from 0.02 to 1.50 mm for the coating layer $Y_C$, and preferably from 1 to 100 μm for the finished layer $Y_E$.

EXAMPLES

The present invention will be described in more detail with reference to the examples. However, it should be noted that the scope of the present invention is not limited thereto. In the following examples, "part(s)" and "%" are based on the mass unless otherwise noted.

(1) Single Fiber Fineness

The number of the microfine fibers in a bundle of fibers was counted on its cross-sectional microphotograph. The single fiber fineness was determined by dividing the total fineness of the bundle of fibers with the counted number.

(2) Thickness of Coating Layer $Y_B$

An artificial leather was cut along the thickness direction, and the cross section was photographed by a scanning electron microscope. The ten upper most points (points closest to the coating layer $Y_B$) of the fibers constituting the upper layer $X_B$ were selected and a horizontal line which averaged the ten vertical positions was drawn. In the same manner, a horizontal line which averaged the vertical positions of ten lower most points (points closest to the coating layer $Y_B$) of the coating layer $Y_C$ was drawn. The thickness of the coating layer $Y_B$ was expressed by the distance between two horizontal lines.

(3) Porous Structures of Coating Layer $Y_B$, Upper Layer $X_B$ and Coating Layer $Y_C$ An artificial leather was cut in the thickness direction, and the porous layer of each of the coating layer $Y_B$, upper layer $X_B$ and coating layer $Y_C$ was cross-sectionally photographed by a scanning electron microscope. The diameters and the distributions of fine pores in the coating layer $Y_B$ and upper layer $X_B$, and large pores (pores with waterdrop shape or bottle shape) in the coating layer $Y_C$ were observed, to determine whether the porous structure of the coating layer $Y_C$ was similar to or different from those of the coating layer $Y_B$ and upper layer $X_B$. Separately, ten fine pores of each of the coating layer $Y_B$ and upper layer $X_B$ and ten large pores of the coating layer $Y_C$ were selected on the scanning electron microphotograph. The largest pore diameter of each layer was expressed by the averaged value. In case of the large pores of the coating layer $Y_C$ having a non-circular shape such as waterdrop shape and bottle shape, the diameter (minor diameter) was measured in the direction perpendicular to the thickness direction.

(4) Calculation of [b/(Xb+b)]/[(a/(Xa+a)]

The coating layer Y was sliced off from a grain-finished artificial leather. The base layer was sliced into the upper layer and the lower layer along the interface between the polymeric elastomer A and the polymeric elastomer B under an electron microscope. Each sliced piece was weighed to obtain the mass of the lower layer (Xa+a) and the mass of the upper layer (Xb+b). Each sliced piece was washed with a separate portion of a solvent for the polymeric elastomer A and polymeric elastomer B (for example, DMF when the polymeric elastomer is made of polyurethane) to remove each polymeric elastomer, dried, and weighed to obtain the mass (Xb and Xa). The masses b and a were obtained by subtracting Xb or Xa from Xb+b or Xa+a. The value of the above formula was calculated from the obtained masses.

(5) Peel Strength

A grain-finished artificial leather was cut in a width of 2.5 cm, which was then adhered to a rubber plate using a polyurethane adhesive containing a crosslinking agent, pressed, dried, and cured at 25° C. for 24 h. The artificial leather and the rubber plate was pulled against using a tensile tester (pulling speed: 100 mm/min, speed of recording paper: 50 mm/min). The average peel strength was read on the recording paper, which was then divided by 2.5 and expressed by a unit of kg/cm.

Example 1

Composite fibers having a fineness of 10 dtex were produced by melt-spinning 50 parts of polyethylene (sea component) and 50 parts of 6-nylon (island component) from the same melting system. After drawing by 3.0 times and crimping, the composite fibers were cut into staples having a fiber length of 51 mm. The staples were carded and made into a web by a crosslap webber. The web was then needle-punched, to obtain an entangled nonwoven fabric X1 having a mass per unit area of 650 g/m².

A 13% solution (polyurethane A solution) of a mixture of a polyether-based polyurethane and a polyester-based polyurethane in dimethylformamide (100% modulus of mixed polyurethane: 40 kg/cm²) was impregnated into the entangled nonwoven fabric X1, and the nonwoven fabric was compressed by pressing with a knife until the thickness was reduced to 90% of the original thickness. Immediately thereafter, on the surface of the entangled nonwoven fabric X1, a 25% solution (polyurethane B solution) of a polyester-based polyurethane having an N % of 4.0 in dimethylformamide was applied (100% modulus of polyurethane: 70 kg/cm²). The polyester-based polyurethane had been prepared by the polymerization of polyethylene/propylene adipate glycol, 4,4'-diphenylmethane diisocyanate (MDI), and ethylene glycol (EG). The polyurethane B solution was allowed to impregnate into the upper layer of the entangled nonwoven fabric X1 utilizing its permeability and the suction force due to the recovery from the compressed state. The layer of the polyurethane B solution covering the surface of the entangled nonwoven fabric X1 was partly scraped off by a knife such that the thickness after the coagulation was 12 μm, to form the coating layer $Y_B$. On the surface of the coating layer $Y_B$, a 18% solution (polyurethane C solution) of a polycarbonate-based polyurethane (100% modulus of polyurethane: 40 kg/cm$^2$) in dimethylformamide for forming the coating layer $Y_C$ was applied. The polycarbonate-based polyurethane contained polyhexacarbonate glycol, polymethylene/propylene adipate and methylenediamine in a ratio of 5:2:3 (by mass), and further contained n-hexane diisocyanate, MDI and EG as the copolymerized components. Each polyurethane was coagulated in a coagulation bath of DMF/water=30/70, to form each layer with a porous structure. After washing with water, the polyethylene was removed by extraction, to convert the composite fibers into the bundles which were composed of 6-nylon microfine fibers having an average single fiber fineness of 0.007 dtex.

On the surface of the coating layer $Y_C$, a polyurethane liquid containing a brown pigment was applied using a gravure roll, to form the finished layer $Y_E$ having a mass per unit area of 5 g/m$^2$ (solid basis). Then, natural leather-like grain patterns were formed by the emboss processing at 150° C. for 30 s under a pressure of 2 kg/cm$^2$. After crumpling using a crumpling machine, a grain-finished artificial leather having a natural leather-like appearance and soft feel was obtained.

The base layer of the obtained grain-finished artificial leather had a thickness of 1.3 mm. The thickness of the upper layer $X_B$ was 0.15 mm, Xb/b was 50/50, Xa/a was 60/40, and the value of the formula 1 was 2.5. The thickness of the coating layer Y was 0.2 mm, while 8 μm for the coating layer $Y_B$ and 0.18 mm for the coating layer $Y_C$. The ratio of the largest pore size of the coating layer $Y_B$ and upper layer $X_B$ and the largest pore size of the coating layer $Y_C$ was 1/25.

The peel strength of the grain-finished artificial leather was 3.3 kg/cm, being well over the required peel strength. Sport shoes made using the grain-finished artificial leather combined a natural leather-like, delicate appearance, a good softness and flexibility, and a high peel strength.

Example 2

A composite spun fiber (number of islands: 50) made of 35 parts of polyethylene (sea component) and 65 parts of 6-nylon (island component) was made into a microfine fiber-forming fiber A having a fiber length of 51 mm and a fineness of 4.0 dtex. Separately, 50 parts of polyethylene (sea component) and 50 parts of 6-nylon (island component) were melt-spun from the same melting system, drawn and cut, to produce a microfine fiber-forming fiber B having a fiber length of 51 mm and a fineness of 4.0 dtex. The microfine fiber-forming fiber A and the microfine fiber-forming fiber B were respectively carded and, using a crosslap webber, respective fibers were made into a web Wa and a web Wb each having a mass per unit area of 350 g/m$^2$. The superposed web Wa and web Wb ware needle-punched with one-barb needles, to produce an entangled nonwoven fabric having a mass per unit area of 650 g/m$^2$ and a density of 0.15 g/cm$^3$. After heating at 150° C., the surface of the nonwoven fabric was made flat and smooth by a heating roll, to produce a heat-set entangled nonwoven fabric X2 having a mass per unit area of 600 g/m$^2$, a density of 0.30 g/cm$^3$ and a thickness of 2.0 mm. Both surfaces of the entangled nonwoven fabric X2 were each mainly made of the microfine fiber-forming fiber A and the microfine fiber-forming fiber B, and the inside thereof was made of the entangled structure of both microfine fiber-forming fibers.

The polyurethane A solution used in Example 1 was impregnated into the entangled nonwoven fabric X2, and then, the nonwoven fabric was compressed by pressing the web Wa with a knife until the thickness was reduced to 90% of the original thickness. Immediately thereafter, the polyurethane B solution used in Example 1 was applied on the web Wb. The polyurethane B solution was allowed to impregnate into the upper layer (mainly made of the web Wb) of the entangled nonwoven fabric X2 utilizing its permeability and the suction force due to the recovery from the compressed state. The layer of the polyurethane B solution covering the surface of the entangled nonwoven fabric X2 was partly scraped off by a knife such that the thickness after the coagulation was 12 μm, to form the coating layer $Y_B$. After applying the polyurethane C solution for forming the coating layer $Y_C$, which was used in Example 1, on the surface of the coating layer $Y_B$, each polyurethane was coagulated in a coagulation bath of DMF/water=30/70, to form each layer with a porous structure. The upper layer (side of the web Wb) was mainly impregnated with the polyurethane B, and the lower layer (side of the web Wa) was mainly impregnated with the polyurethane A.

After washing with water, the polyethylene was removed by extraction, to convert the composite fibers into the bundles which were composed of 6-nylon microfine fibers having a single fiber fineness of 0.0001 dtex (upper layer $X_B$) and the bundles which were composed of 6-nylon microfine fibers having a single fiber fineness of 0.07 dtex (lower layer $X_A$).

Then, in the same manner as in Example 1, a grain-finished artificial leather having a natural leather-like appearance and soft feel was produced.

The base layer of the obtained grain-finished artificial leather had a thickness of 1.4 mm. The thickness of the upper layer $X_B$ was 0.3 mm, Xb/b was 50/50, Xa/a was 60/40, and the value of the formula 1 was 2.5. The thickness of the coating layer Y was 0.15 mm, while 7 μm for the coating layer $Y_B$, and 0.13 mm for the coating layer $Y_C$. The ratio of the largest pore size of the coating layer $Y_B$ and upper layer $X_B$ and the largest pore size of the coating layer $Y_C$ was 1/20.

The peel strength of the grain-finished artificial leather was 2.8 kg/cm, being well over the required peel strength. The creases were fine and the grain-finished artificial leather was close to natural leathers. Sport shoes made using the grain-finished artificial leather combined a natural leather-like, delicate appearance, a good softness and flexibility, and a high peel strength.

Example 3

A grain-finished artificial leather was produced in the same manner as in Example 1, except that the coating layer $Y_B$ was formed by scraping off a part of the layer of the polyurethane B solution covering the surface of the entangled nonwoven fabric X1 by a knife such that the thickness after the coagulation was 4 μm. The obtained grain-finished artificial leather had a natural leather-like appearance and soft feel. The thickness of the coating layer $Y_B$ was 1 μm. The peel strength was 2.9 kg/cm, being well over the required peel strength. Sport shoes made using the grain-finished artificial leather combined a natural leather-like, delicate appearance, a good softness and flexibility, and a high peel strength.

Comparative Example 1

A grain-finished artificial leather was produced in the same manner as in Example 1, except that the layer of the polyurethane B solution covering the surface of the entangled nonwoven fabric X1 was completely scraped off by a knife so as to form a coating layer composed of only the coating layer $Y_C$ and finished layer $Y_E$ without forming the coating layer $Y_B$. The base layer was made of the bundles composed of 6-nylon microfine fibers of 0.007 dtex, the polyurethane A and the polyurethane B. The thickness of the upper layer $X_B$ was 0.15 mm, Xb/b and Xa/a were each 60/40, and the value of the formula 1 was 1.

The grain-finished artificial leather has a natural leather-like appearance, but the feel was hard because the fibers in the surface portion were fixed by the polyurethane. To improve the feel, the grain-finished artificial leather was crumpled using a crumpling machine. However, the coating layer and the base layer were made disharmonious with each other in their feels because of wrinkles. The peel strength was as low as 2.2 kg/cm, being not suitable for the production of sport shoes.

Comparative Example 2

A grain-finished artificial leather was produced in the same manner as in Example 1, except for forming the coating layer $Y_C$ from the polyurethane B solution. The peel strength was 2.8 kg/cm or more and the feel was soft. However, the grain-finished artificial leather failed to have natural leather-like grain patterns, and therefore, the quality was poor. Sport shoes made using the grain-finished artificial leather were sufficient with respect to the flexibility and peel strength, but lacked a natural leather-like, delicate appearance and poor in quality.

Comparative Example 3

A grain-finished artificial leather was produced in the same manner as in Example 2, except that the entangled nonwoven fabric X2 was impregnated with the polyurethane A solution, the polyurethane A solution covering the surface was removed by a knife, and the surface was coated with the polyurethane C solution. After crumpling using a crumpling machine, the grain-finished artificial leather showed a natural leather-like appearance and flexibility. However, the peel strength was as low as 1.8 kg/cm, being less applicable to the production of sport shoes.

Comparative Example 4

A grain-finished artificial leather was produced in the same manner as in Example 1, except that the coating layer $Y_B$ was formed by scarping off a part of the polyurethane B solution layer covering the surface of the entangled nonwoven fabric X1 by a knife such that the thickness after the coagulation was 18 μm. The coating layer $Y_B$ of the obtained grain-finished artificial leather had a thickness of 14 μm. The grain-finished artificial leather had a natural leather-like appearance, but the feel thereof was rubbery. A required level of peel strength was not obtained, and the coating layer $Y_B$ and the coating layer $Y_C$ were separated.

INDUSTRIAL APPLICABILITY

The grain-finished artificial leather of the present invention combines a natural leather-like, delicate appearance, a soft surface, a good flexibility, and a high peel strength. In addition, the grain-finished artificial leather is excellent in a natural leather-like, high-quality appearance having clear grain patterns, a flexible, harmonized feel and a peel strength. Therefore, the grain-finished artificial leather is applicable to wide fields such as sport shoes, game balls and bags.

What is claimed is:

1. A grain-finished artificial leather comprises a base layer which is composed of an entangled nonwoven fabric X made of bundles of microfine fibers having an average single fiber fineness of 0.07 dtex or less and impregnated with a polymeric elastomer A and a polymeric elastomer B, and a coating layer Y which is formed on one of surfaces of the base layer;

the entangled nonwoven fabric X comprising a lower layer $X_A$ and an upper layer $X_B$ wherein the lower layer $X_A$ is impregnated mainly with the polymeric elastomer A which is substantially not adhered to the bundles of microfine fibers and the upper layer $X_B$ is impregnated mainly with the polymeric elastomer B which is substantially not adhered to the bundles of microfine fibers; and the coating layer Y comprising a coating layer $Y_B$ having a thickness of 1 to 10 μm which is made of the polymeric elastomer B and formed on the upper layer $X_B$, a coating layer $Y_C$ which is made of a polymeric elastomer C and formed on the coating layer $Y_B$, and a finished layer $Y_E$ which is formed on the coating layer Y.

2. The grain-finished artificial leather according to claim 1, wherein each of the coating layer $Y_B$ and the coating layer $Y_C$ has a porous structure.

3. The grain-finished artificial leather according to claim 2, wherein the porous structure of the coating layer $Y_B$ is different form that of the coating layer $Y_C$.

4. The grain-finished artificial leather according to claim 1, satisfying the following formula 1:

$$[b/(Xb+b))/(a/(Xa+a))] \geq 1.2 \quad (1)$$

wherein b is a mass of the polymeric elastomer B impregnated into the upper layer $X_B$, Xb is a mass of the entangled nonwoven fabric constituting the upper layer $X_B$, a is a mass of the polymeric elastomer A impregnated into the lower layer $X_A$, and Xa is a mass of the entangled nonwoven fabric constituting the lower layer $X_A$.

5. The grain-finished artificial leather according to claim 1, satisfying the following formula 2:

$$MD_B - MD_C \geq 30 kg/cm^2 \quad (2)$$

wherein $MD_B$ is a 100% modulus of the polymeric elastomer B and $MD_C$ is a 100% modulus of the polymeric elastomer C.

6. The grain-finished artificial leather according to claim 1 satisfying the following formula 3:

$$MD_B - MD_A \geq 10 kg/cm^2 \quad (3)$$

wherein $MD_B$ is a 100% modulus of the polymeric elastomer B and $MD_A$ is a 100% modulus of the polymeric elastomer A.

* * * * *